United States Patent
Yamamoto et al.

(10) Patent No.: US 7,342,088 B2
(45) Date of Patent: Mar. 11, 2008

(54) METHOD FOR PRECIPITATION OF POLYPHENYLENE ETHER

(75) Inventors: Shigero Yamamoto, Sodegaura (JP); Mutsumi Maeda, Sodegaura (JP); Yuji Takeda, Yokkaichi (JP)

(73) Assignees: Asahi Kasei Chemicals Corporation, Tokyo (JP); Mitsubishi Gas Chemical Company, Inc., Tokyo (JP)

( * ) Notice: Subject to any disclaimer, the term of this patent is extended or adjusted under 35 U.S.C. 154(b) by 481 days.

(21) Appl. No.: 10/503,072

(22) PCT Filed: Jan. 30, 2003

(86) PCT No.: PCT/JP03/00909

§ 371 (c)(1),
(2), (4) Date: Jul. 30, 2004

(87) PCT Pub. No.: WO03/064499

PCT Pub. Date: Aug. 7, 2003

(65) Prior Publication Data

US 2005/0131108 A1 Jun. 16, 2005

(30) Foreign Application Priority Data

Feb. 1, 2002 (JP) ............................ 2002-025096

(51) Int. Cl.
*C08F 6/00* (2006.01)

(52) U.S. Cl. ...................... 528/491; 528/495; 528/496; 528/497; 528/499

(58) Field of Classification Search ................ 528/491, 528/495, 496, 497, 499
See application file for complete search history.

(56) References Cited

U.S. PATENT DOCUMENTS 6,627,727 B1 * 9/2003 Yoshida et al. ............. 528/491

FOREIGN PATENT DOCUMENTS

| EP | 1209183 A1 | 5/2002 |
| JP | 5-78471 A | 3/1993 |
| JP | 7-97441 A | 4/1995 |
| JP | 2000-281777 A | 10/2000 |
| JP | 2000-281799 A | 10/2000 |
| JP | 2001-122962 A | 5/2001 |
| JP | 2001-310946 A | 11/2001 |

OTHER PUBLICATIONS

English language abstract of JP 05078472 (Mar. 30, 1993).

* cited by examiner

*Primary Examiner*—Edward J. Cain
(74) *Attorney, Agent, or Firm*—Birch, Stewart, Kolasch & Birch, LLP

(57) ABSTRACT

Method for precipitating polyphenylene ether which decreases fine particles therein and reduces periodic fluctuations in particle size. Method provides homogeneous polyphenylene ether particles. Polyphenylene ether particles are precipitated using mixed solution comprising good solvent for polyphenylene ether and poor solvent for polyphenylene ether. Method employs precipitation tank equipped with draft tube, stirring blade, baffle(s), solution supply port, poor solvent supply port, and exhaust port. Polyphenylene ether particles and poor solvent are added to mixed solution comprising good solvent and circularly flowed by rotation of stirring blade, polyphenylene ether solution for solution supply port, and poor solvent for poor solvent supply port, thereby precipitating polyphenylene ether particles having desired properties.

8 Claims, 1 Drawing Sheet

METHOD FOR PRECIPITATION OF POLYPHENYLENE ETHER

CROSS-REFERENCES TO RELATED APPLICATIONS

This application is a U.S. national phase application under 35 U.S.C. § 371 of PCT/JP03/00909, filed Jan. 30, 2003. This application claims priority under 35 U.S.C. § 119 to JP 2002-25096, filed Feb. 1, 2002.

1. Technical Field

The present invention relates to a method for precipitating polyphenylene ether, and a method for precipitating polyphenylene ether which decreases the number of fine particles of polyphenylene ether particles and reduces periodic fluctuations in particle size, thereby being able to stably produce homogeneous polyphenylene ether particles.

2. Background Art

A polyphenylene ether resin made from polyphenylene ether is a plastic material which can provide products and parts in desired form by a molding process such as melt injection molding or melt extrusion molding, and which has been widely used as a material for products and parts in the field of electronics and electricity, the field of automobiles and the field of various other industrial materials.

As a method for producing polyphenylene ether, there is a method of oxidatively polymerizing a phenol compound in the presence of a copper compound and an amine compound in a good solvent for polyphenylene ether. As a method for precipitating the polyphenylene ether from a polyphenylene ether solution obtained by this method, there is known a method for precipitating polyphenylene ether particles by adding a poor solvent for polyphenylene ether, such as methanol, to the solution.

However, the polyphenylene ether particles precipitated by conventional methods contain a lot of fine particles therein, and have the problem of clogging in a filtering step required after a sedimentation step in a polyphenylene ether production process and also the problem that a polyphenylene ether composition is not smoothly supplied to an extruder in a melt kneading step required when being pelletized.

Further, in the polyphenylene ether particles precipitated by conventional methods, the phenomenon of periodic fluctuations in particle size thereof occurs, which poses the problem that the productivity fluctuates in the filtering step and drying step.

Accordingly, the conventional polyphenylene ether production methods suffer from the problem with respect to productivity in other steps in the polyphenylene ether production process and in the step for obtaining pellets of the polyphenylene ether composition, so that they do not sufficiently comply with industrial demands.

An object of the invention is to provide a method for precipitating polyphenylene ether by mixing a polyphenylene ether solution with a poor solvent for polyphenylene ether to precipitate polyphenylene ether particles, which can stably produce polyphenylene ether particles with fewer fine particles of the polyphenylene ether particles, reduced periodic fluctuations in particle size, and with homogeneous particle size, thus sufficiently complying with the industrial demands.

DISCLOSURE OF THE INVENTION

As a result of extensive studies for achieving the above-mentioned object, the present inventors have completed a method for precipitating polyphenylene ether by mixing a polyphenylene ether solution comprising polyphenylene ether and a good solvent therefor with a poor solvent for polyphenylene ether to precipitate polyphenylene ether particles, wherein the number of fine particles of the polyphenylene ether particles is decreased, and periodic fluctuations in particle size are reduced, thereby making it possible to stably produce homogeneous polyphenylene ether particles and sufficiently complying with the industrial demands.

That is, the invention provides a method for precipitating polyphenylene ether by mixing a polyphenylene ether solution comprising polyphenylene ether and a good solvent therefor with a poor solvent for polyphenylene ether to precipitate polyphenylene ether particles, the method comprising:

using a precipitation tank equipped with (a) a draft tube, (b) an at least one-stage stirring blade disposed in the draft tube and selected from an inclined paddle blade, a screw blade and a ribbon blade, (c) one or more baffles disposed on the outside of the draft tube, (d) a solution supply port, (e) a poor solvent supply port and (f) an exhaust port;

adding, to a mixed solution comprising the good solvent, the poor solvent and the polyphenylene ether particles, the mixed solution circularly flowing by rotation of the stirring blade (b), the polyphenylene ether solution from the solution supply port (d) and concurrently adding a poor solvent from the poor solvent supply port (e), thereby precipitating polyphenylene ether particles; and discharging and recovering the precipitated polyphenylene ether particles together with the mixed solution from the exhaust port (f).

Figure 1:
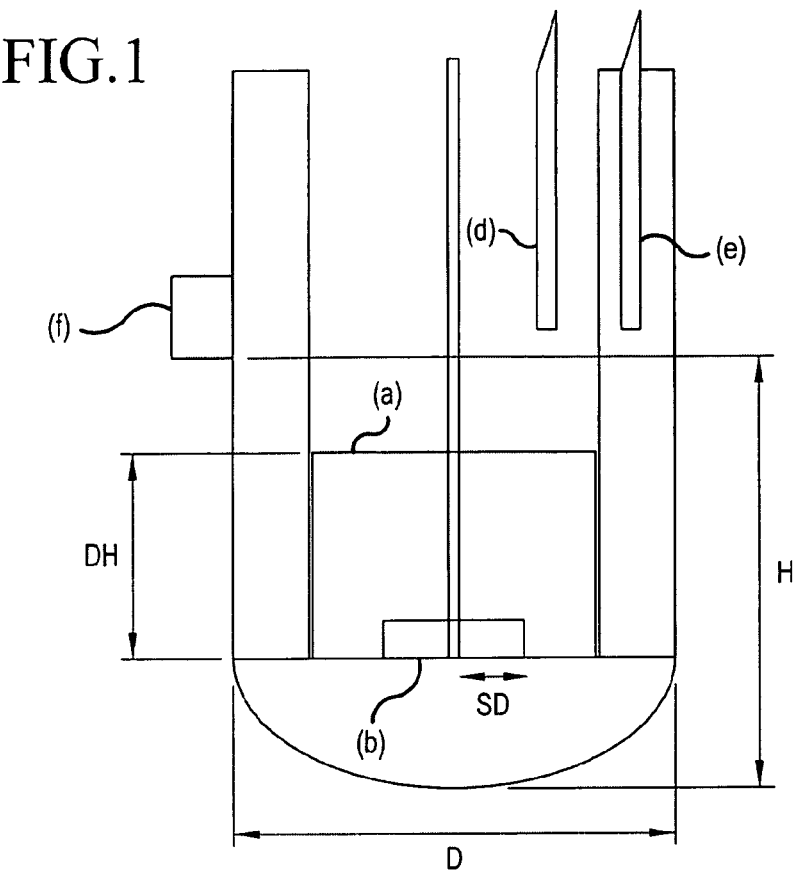
FIG. 1 is a sectional side view showing the precipitation tank used in Example 1.
Figure 2:
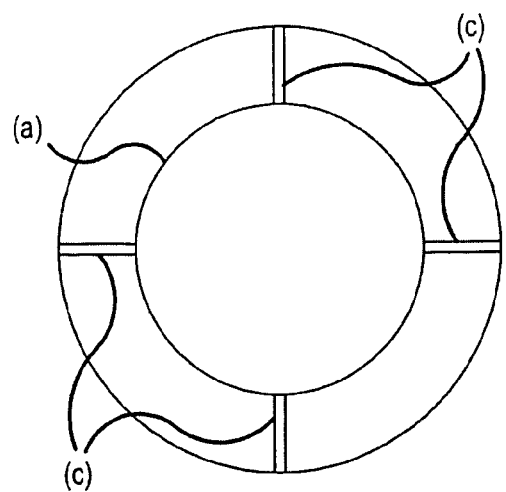
FIG. 2 is a schematic plan view showing the baffles disposed on the outside of the draft tube of the precipitation tank used in Example 1.

In the drawings, the reference character (a) designates a draft tube, (b) designates a stirring blade (one-stage paddle), (c) designates a baffle, (d) designates a solution supply port, (e) designates a poor solvent supply port, (f) designates an exhaust port, D designates the diameter of the precipitation tank, H designates the liquid height, DH designates the height of the draft tube, and SD designates the diameter of the blade.

BEST MODE FOR CARRYING OUT THE INVENTION

The polyphenylene ether of the invention has a main chain structure of the following formula (1):

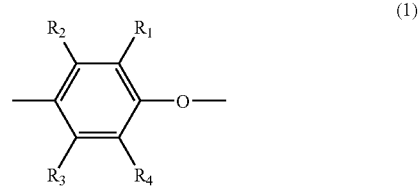

(1)

$R_1$ and $R_4$ in the polyphenylene ether of the invention represented by formula (1) each independently represent hydrogen, primary or secondary lower alkyl, phenyl, aminoalkyl or hydrocarbonoxy. $R_2$ and $R_3$ each independently represent hydrogen, primary or secondary lower alkyl or phenyl.

The polyphenylene ether of the invention is a polymer or a copolymer having a reduced viscosity measured with a 0.5 g/dl chloroform solution at 30° C. of within the range of 0.15 to 1.0 dl/g, and more preferably within the range of 0.20 to 0.70 dl/g.

Specifically, the polyphenylene ether of the invention is poly(2,6-dimethyl-1,4-phenylene ether), poly(2-methyl-6-ethyl-1,4-phenylene ether), poly(2-methyl-6-phenyl-1,4-phenylene ether), poly(2,6-dichloro-1,4-phenylene ether) or the like.

Other specific examples of the polyphenylene ethers of the invention also include a polyphenylene ether copolymer such as a copolymer of 2,6-dimethylphenol and a phenol (e.g., 2,3,6-trimethylphenol or 2-methyl-6-butylphenol).

Of the polyphenylene ethers of the invention described above, poly(2,6-dimethyl-1,4-phenylene ether) and a copolymer of 2,6-dimethylphenol and 2,3,6-trimethylphenol can be preferably used, and most preferred is poly(2,6-dimethyl-1,4-phenylene ether).

There is no particular limitation on the polymerization method of the polyphenylene ether for use in the invention.

Examples of the polymerization method of the polyphenylene ether for use in the invention include the method described in U.S. Pat. No. 3,306,874, in which 2,6-xylenol is oxidatively polymerized using a complex of a cuprous salt and an amine as a catalyst. The methods described in U.S. Pat. Nos. 3,306,875, 3,257,357 and 3,257,358, JP 52-017880 B, JP 50-051187 A, JP 63-152628 A and the like are also preferred as the production methods of the polyphenylene ether.

The end structure of the polyphenylene ether of the invention is preferably a structure of the following formula (2):

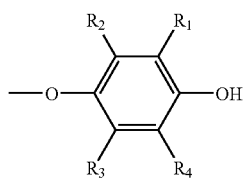

wherein $R_1$, $R_2$, $R_3$ and $R_4$ are each defined in the same manner as with $R_1$, $R_2$, $R_3$ and $R_4$ in the above-shown formula (1).

The end structure of the polyphenylene ether of the invention is more preferably a structure of the following formula (3):

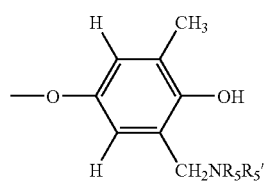

wherein $R_5$ and $R_5'$ each represent hydrogen or an alkyl group.

Techniques for obtaining the polyphenylene ether having an end structure of formula (3) include, for example, a method of oxidatively coupling 2,6-dimethylphenol in the presence of a primary or secondary amine using a catalyst containing copper or manganese.

As the above-mentioned primary or secondary amine, a dialkylamine is preferred, and di-n-butylamine, dimethylamine or diethylamine is more preferably used.

The good solvent for the polyphenylene ether of the invention means a solvent which satisfactorily dissolves polyphenylene ether to form a homogeneous polyphenylene ether solution.

The polyphenylene ether solution of the invention is a solution in which polyphenylene ether is homogeneously dissolved in the good solvent.

The polyphenylene ether concentration in the polyphenylene ether solution of the invention is preferably from 10 to 30% by weight based on the polyphenylene ether solution.

As the good solvent for the polyphenylene ether of the invention, preferred is at least one solvent selected from benzene, toluene and xylene.

The poor solvent for the polyphenylene ether of the invention is a solvent which does not dissolve polyphenylene ether.

As the poor solvent for the polyphenylene ether of the invention, preferred is at least one solvent selected from methanol, ethanol, isopropanol, n-butanol, acetone, methyl ethyl ketone and water.

In the invention, it is preferred that the good solvent for polyphenylene ether comprises at least one solvent selected from benzene, toluene and xylene, and the poor solvent for polyphenylene ether comprises at least one solvent selected from methanol, ethanol, isopropanol, n-butanol, acetone, methyl ethyl ketone and water.

In the invention, it is most preferred to use toluene as the good solvent for polyphenylene ether, and methanol as the poor solvent for polyphenylene ether.

The polyphenylene ether particles of the invention are particles comprising polyphenylene ether.

The polyphenylene ether particles of the invention are mainly intended for use in the formation of a composition with other components by melt kneading after filtering and a drying step. As the polyphenylene ether particles of the invention, it is preferred that the average particle size is 400 μm or more, and that the content of fine particles having a particle size of 105 μm or less is 5% by weight or less.

As the polyphenylene ether particles, it is more preferred that the average particle size is 450 μm or more, that the fluctuation in particle size during precipitation, that is, the fluctuation in average particle size over precipitating time, is 100 μm or less, and that the content of fine particles having a particle size of 105 μm or less is 2% by weight or less.

As the polyphenylene ether particles, it is especially preferred that the average particle size is 500 μm or more, that the fluctuation in particle size during precipitation, that is, the fluctuation in average particle size over precipitating time, is 50 μm or less, and that the content of fine particles having a particle size of 105 μm or less is 1% by weight or less.

In the invention, means for obtaining polyphenylene ether particles have been studied. As a result, it has been discovered that the use of a specific precipitation tank equipped with a draft tube described below allows the polyphenylene ether solution supplied to be effectively mixed with the poor solvent to stably precipitate polyphenylene ether particles, and that discharging a mixed solution in the precipitation tank makes it possible to effectively produce polyphenylene ether particles with less number of fine particles, reduced periodic fluctuations in particle size, and homogeneous particle size.

Further, the precipitation tank of the invention is a precipitation tank having an at least one-stage stirring blade (b) disposed in a draft tube (a) and selected from an inclined paddle blade, a screw blade and a ribbon blade, and one or more baffles (c) disposed on the outside of the draft tube (a).

The draft tube (a) of the invention is a partition wall provided in the precipitation tank. The shape thereof is most preferably cylindrical. However, the cross section thereof is not limited to circular, but may be elliptical, polygonal, or the like.

The draft tube (a) of the invention is preferably disposed concentrically within the precipitation tank.

The inclined paddle blade of the invention is preferably a stirring blade formed by inclining an ordinary paddle at 5 to 85 degrees with respect to the rotational direction, and more preferably a stirring blade formed by inclining an ordinary paddle at 35 to 55 degrees. When a paddle blade having no inclination is used, the circulation flow described below is not formed, so that the mixed solution does not become homogeneous, resulting in increased fluctuations in the average particle size of the polyphenylene ether particles.

The screw blade of the invention is preferably a stirring blade having a shape similar to that of a screw used for ships.

The ribbon blade of the invention is preferably a helical stirring blade of single blade type or double blade type.

The baffles (c) of the invention are baffle plates fixed in a stirring tank in order to control the flow.

In the precipitation tank of the invention, the mixed solution comprising the good solvent, the poor solvent and polyphenylene ether particles is pushed out to the bottom of the tank or the liquid level of the mixed solution while circulating in the draft tube with the rotation of the stirring blade, and then, flows between the draft tube and a wall of the precipitation tank as an approximately perpendicular ascending flow or descending flow to circularly flow inside and outside the draft tube.

In the precipitation tank of the invention, the circulation direction of the mixed solution depends on the rotational direction of the stirring blade and the shape of the stirring blade.

In the invention, the polyphenylene ether solution is added from a solution supply port (d) to the mixed solution.

In the invention, the polyphenylene ether solution is preferably added to the mixed solution from the solution supply port (d) provided above the liquid level of the mixed solution.

In the invention, a method of adding dropwise the polyphenylene ether solution from the solution supply port (d) provided above the liquid level of the mixed solution to a downward-flowing portion of the circularly flowing mixed solution can be more preferably used, because this causes no occurrence of scale of the polyphenylene ether in the precipitation tank.

In the invention, the poor solvent is added from a poor solvent supply port (e) at the same time that the polyphenylene ether solution is added from the solution supply port (d) to the mixed solution.

The poor solvent supply port (e) is preferably provided directly on the wall of the precipitation tank above the liquid level of the mixed solution or between the draft tube and the precipitation tank above the liquid level of the mixed solution.

In the precipitation method of the polyphenylene ether of the invention, the polyphenylene ether particles precipitated are discharged together with the mixed solution from an exhaust port (f), and recovered.

In the precipitation method of the polyphenylene ether of the invention, the mixed solution is preferably overflowed from the exhaust port (f) provided at the position of the liquid level of the mixed solution in the precipitation tank, thereby discharging and recovering the polyphenylene ether particles from the precipitation tank.

In the precipitation method of polyphenylene ether of the invention, it is preferred that the ratio of the precipitation tank diameter/the liquid height of the mixed solution in the precipitation tank (that is, the distance from the liquid level to the bottom of the tank) is from 0.1 to 2, that the ratio of the height of the draft tube/the above-mentioned liquid height is from 0.05 to 0.6, and that the ratio of "the vertical interval between the liquid level and the most upper portion of the draft tube"/the above-mentioned liquid height is from 0.01 to 0.3.

When the liquid level is at a position higher than the most upper portion of the draft tube, "the vertical interval between the liquid level and the most upper portion of the draft tube" as used herein shall be considered to be a positive value, and when the liquid level is lower than the most upper portion of the draft tube, it shall be considered to be a negative value.

When the ratio of the precipitation tank diameter/the liquid height of the mixed solution in the precipitation tank (that is, the distance from the liquid level to the bottom of the tank) is less than 0.1, it is unfavorable in terms of productivity.

When the ratio of the precipitation tank diameter/the liquid height of the mixed solution in the precipitation tank (that is, the distance from the liquid level to the bottom of the tank) exceeds 2, high stirring power is required, which is unfavorable in terms of production cost.

In the precipitation method of the polyphenylene ether of the invention, it is preferred to carry out stirring with such stirring power that the mixed solution can be effectively discharged from the exhaust port (f), and that the polyphenylene ether particles do not stay on the bottom of the precipitation tank.

When the ratio of the draft tube height/the above-mentioned liquid height is less than 0.05, a stable ascending flow or descending flow may be not obtained in some cases.

When the ratio of the draft tube height/the above-mentioned liquid height exceeds 0.6, an ascending flow or descending flow may be not obtained stably in some cases.

When the ratio of "the vertical interval between the liquid level and the most upper portion of the draft tube"/the above-mentioned liquid height is less than 0.01, the discharge of the mixed solution may be not stabilized in some cases.

When the ratio of "the vertical interval between the liquid level and the most upper portion of the draft tube"/the above-mentioned liquid height exceeds 0.3, a stable ascending flow or descending flow may be not obtained in some cases.

In the precipitation method of polyphenylene ether of the invention, the weight ratio of the poor solvent/the good solvent in the mixed solution is preferably from 0.3 to 2.0.

When the weight ratio of the poor solvent/the good solvent in the mixed solution is less than 0.3, there is high possibility that scale will occur during precipitation.

When the weight ratio of the poor solvent/the good solvent in the mixed solution exceeds 2.0, it is unfavorable in terms of production cost.

In the precipitation method of polyphenylene ether of the invention, it is more preferred that water contained in the poor solvent is from 0.3 to 50 parts by weight.

In the precipitation method of polyphenylene ether of the invention, the temperature of the mixed solution is preferably from 30 to 60° C.

In the precipitation method of polyphenylene ether of the invention, the quotient obtained by dividing the sum of the supply speed of the polyphenylene ether solution supplied from the supply port into the precipitation tank and the supply speed of the poor solvent concurrently supplied into the precipitation tank by the liquid amount of the mixed solution remaining in the precipitation tank is defined as the average residence time during which the polyphenylene ether particles stay in the precipitation tank.

In the invention, the average residence time during which the polyphenylene ether particles stay in the precipitation tank is preferably from 2.0 to 30 minutes.

When the average residence time is 2.0 minutes or less, the content of the good solvent in the polyphenylene ether particles is increased, which may sometimes cause the particles to be firmly fixed to one another after discharge.

When the average residence time exceeds 30 minutes, it poses a problem in terms of productivity and production cost.

The precipitation method of polyphenylene ether of the invention can stably produce homogeneous polyphenylene ether particles with an extremely less number of fine particles thereof and extremely reduced periodic fluctuations in polyphenylene ether particle size, so that it constitutes a precipitation method of polyphenylene ether which complies sufficiently with the industrial demands.

The polyphenylene ether particles obtained by the precipitation method of polyphenylene ether of the invention are homogeneous polyphenylene ether particles with extremely less number of fine particles thereof and extremely narrow particle size distribution, so that they give extremely high productivity when melt kneaded with another composition.

That is, the polyphenylene ether particles obtained by the precipitation method of polyphenylene ether of the invention can be preferably used as a raw material for a polyphenylene ether composition.

The polyphenylene ether particles of the invention can be extremely preferably used in a polymer alloy obtained by kneading with a thermoplastic resin such as a styrenic resin, a polyamide, a polyimide, a polyetherimide, a polyester or a polycarbonate.

The polyphenylene ether particles of the invention, and the polyphenylene ether composition and polymer alloy using the polyphenylene ether particles of the invention are not particularly limited in their applications, and are widely applicable to applications in the field of electronics and electricity, the field of automobiles and the fields of various other industrial materials.

The polymer alloy or polymer composite containing the polyphenylene ether particles of the invention is preferably applicable in the field of electronics and electricity, the field of automobiles and the field of various other industrial materials.

Further, the polyphenylene ether particles obtained by the precipitation method of polyphenylene ether of the invention are homogeneous polyphenylene ether particles having a greatly smaller number of fine particles and extremely narrow particle size distribution, so that productivity is stabilized in the filtering step and the drying step.

EXAMPLES

Embodiments of the invention will be illustrated in greater detail with reference to the following examples, but the invention should not be construed as being limited thereto.

In the Examples and Comparative Example, the following polyphenylene ethers were used.

A-1: According to the method described in Example 3 of JP 59-023332 B, 13% by weight of a toluene solution of 2,6-dimethylphenol was added in the presence of each catalyst and di-n-butylamine over a period of 35 minutes while supplying oxygen, and after 100 minutes lapse of time, the supply of oxygen was stopped. An aqueous solution of trisodium ethylenediaminetetraacetate was added to the polymerization mixture, and the mixture was maintained at 70° C. Then, the mixture was sent to a centrifuge manufactured by Sharpless Co., and an aqueous phase containing each catalyst and trisodium ethylenediaminetetraacetate was separated to obtain a polyphenylene ether solution (A-1) having a polyphenylene ether content of 13.5% and a specific gravity of 0.894. The reduced viscosity of the polyphenylene ether contained in (A-1) was 0.53 dl/g, when measured with a 0.5 g/dl chloroform solution.

A-2: A polyphenylene ether solution (A-2) having a polyphenylene ether content of 22.3% and a specific gravity of 0.911 was obtained in the same manner as with the above-mentioned (A-1) with the exceptions that 22% by weight of a toluene solution of 2,6-dimethylphenol was used and the supply of oxygen was stopped after 85 minutes lapse from the start of polymerization. The reduced viscosity of the polyphenylene ether contained in (A-2) was 0.40 dl/g, when measured with a 0.5 g/dl chloroform solution.

Example 1

A precipitation tank with a jacket, which had an internal diameter of 133 mm and was provided with an exhaust port having a bore diameter of 25 mm at a position where the vertical interval between the liquid level from the bottom of the tank and the bottom of the tank corresponded to 95 mm, was equipped with a draft tube having an internal diameter of 80 mm and a draft tube height of 40 mm at a position where the vertical interval between the liquid level and the most upper portion of the draft tube corresponded to 27 mm. This precipitation tank was equipped with a one-stage four-blade inclined paddle blade (inclination: 45 degrees, blade diameter: 33 mm) as a stirring blade. The volume of a solution remaining in this precipitation tank was 1100 ml.

In the precipitation tank, 370 g of toluene, 420 g of methanol and 10 g of water were placed, and stirred at a stirring revolution of 600 rpm. By stirring, a spiral descending flow occurred inside the draft tube, and an approximately perpendicular ascending flow occurred between the outside of the draft tube and an inner wall of the precipitation tank.

Hot water was allowed to flow in the jacket to adjust the temperature in the precipitation tank to 50° C.

Then, the polyphenylene ether solution (A-1) was added at an addition rate of 190 g/minute at a diagonal position to the exhaust port inside the draft tube in the precipitation tank, and a mixed solution of 97.5 wt % of methanol and 2.5 wt % of water was added at an addition rate of 100 g/minute at a diagonal position to the exhaust port and from the same height outside the draft tube in the precipitation tank. A mixed solution overflowed from the exhaust port was recovered. In addition, samples were separately collected after 10, 20, 40, 80 and 160 minutes from the start of the addition of the mixed solution of methanol and water. During the precipitation, no change was observed in the flow state of the mixed solution, and it was stable. The average residence time was 3.2 minutes.

A sample collected from the recovered mixed solution and the samples collected after the respective elapses of time were each filtered, washed by mixing methanol, and then, filtered again, followed by vacuum drying at 140° C. for 4 hours to obtain polyphenylene ether particles.

The mixed solution could be filtered without problems.

The volatile matter content of the dried polyphenylene ether particles was 0.1% by weight or less.

The resulting polyphenylene ether particles were sieved, and the weight of each fraction was measured.

From a cumulative curve of particle size distribution, the particle size corresponding to a center cumulative value (median diameter) was taken as the average particle size.

Similarly, the content (wt %) of particles having a size of 105 μm or less obtained from the cumulative curve of particle size distribution was taken as the fine particle rate.

Variations with time of the average particle size and the fine particle rate of the resulting polyphenylene ether particles were extremely small, and the fine particle rate thereof was extremely low.

When the resulting polyphenylene ether particles were melt kneaded using an extruder, the polyphenylene ether particles followed the extruder very well, and it was possible to stably produce a composition.

TABLE 1

|  | 10 min | 20 min | 40 min | 80 min | 160 min | Total Amount |
|---|---|---|---|---|---|---|
| Average Particle Size μm | 633 | 646 | 683 | 654 | 635 | 632 |
| Fine Particle Rate wt % | 0.33 | 0.39 | 0.35 | 0.36 | 0.34 | 0.36 |

Example 2

The same operations as in Example 1 were conducted with the exception that the polyphenylene ether solution (A-2) was used.

For a mixed solution overflowed from the exhaust port, samples were collected after 10, 20, 40, 80 and 160 minutes from the start of addition. During the precipitation, no change was observed in the flow state of the mixed solution, and it was stable. The average residence time was 3.3 minutes.

The resulting mixed solution was treated in the same manner as in Example 1, and the weight average particle size of the polyphenylene ether particles and the fine particle rate (the content (wt %) of particles having a size of 105 μm or less contained in the polyphenylene ether particles) were measured.

The mixed solution could be filtered without problems.

The volatile matter content of the dried polyphenylene ether particles was 0.1% by weight or less.

Similarly to Example 1, variations with time of the average particle size and the fine particle rate of the resulting polyphenylene ether particles were extremely small, and the fine particle rate thereof was extremely low.

When the resulting polyphenylene ether particles were melt kneaded using an extruder, it was possible to stably produce a composition, similarly to Example 1.

TABLE 2

|  | 10 min | 20 min | 40 min | 80 min | 160 min | Total Amount |
|---|---|---|---|---|---|---|
| Average Particle Size μm | 503 | 522 | 513 | 515 | 519 | 506 |
| Fine Particle Rate wt % | 0.52 | 0.59 | 0.53 | 0.56 | 0.54 | 0.54 |

Comparative Example 1

A precipitation tank with a jacket, which had an internal diameter of 133 mm and was provided with an exhaust port having a bore diameter of 25 mm at a position where the vertical interval between the liquid level from the bottom of the tank and the bottom of the tank corresponded to 95 mm, was equipped with no draft tube, and with a one-stage four-blade inclined paddle blade (inclination: 45 degrees, blade diameter: 33 mm) as a stirring blade.

The volume of a solution remaining in this precipitation tank was 1140 ml. In the precipitation tank, 370 g of toluene, 420 g of methanol and 10 g of water were placed, and stirred at a stirring revolution of 600 rpm. A spiral flow and a vortex occurred all over the inside of the precipitation tank by stirring.

Hot water was allowed to flow in the jacket to adjust the temperature in the precipitation tank to 50° C.

Then, the polyphenylene ether solution (A-1) was added at an addition rate of 190 g/minute at a diagonal position to the exhaust port in the precipitation tank, and a mixed solution of 97.5 wt % of methanol and 2.5 wt % of water was added at an addition rate of 100 g/minute from the same height.

For a mixed solution overflowed from the exhaust port, samples were collected after 10, 20, 40, 80 and 160 minutes from the start of addition. At the start of precipitation, many small-sized particles were observed, and the size of the particles gradually increased. Then, fine particles were produced. Thus, the particle size was not stabilized.

The average residence time was 3.3 minutes.

An attempt was made to treat the resulting mixed solution in the same manner as in Example 1. However, clogging occurred in filtering, so that it was necessary to exchange the filter.

The volatile matter content of the polyphenylene ether particles after drying was 0.8% by weight.

The weight average particle size of the polyphenylene ether particles and the fine particle rate (the content (wt %) of particles having a size of 105 μm or less contained in the polyphenylene ether particles) were measured.

Different from the Examples, variations with time of the average particle size and the fine particle rate of the resulting polyphenylene ether particles were large, and the fine particle rate thereof was high.

When the resulting polyphenylene ether particles were melt kneaded using an extruder, the polyphenylene ether particles followed the extruder poorly, which caused failure in attempting to stably produce a composition.

TABLE 3

|  | 10 min | 20 min | 40 min | 80 min | 160 min | Total Amount |
|---|---|---|---|---|---|---|
| Average Particle Size μm | 533 | 762 | 453 | 175 | 213 | 401 |
| Fine Particle Rate wt % | 15.6 | 10.6 | 22.4 | 53.3 | 48.2 | 31.2 |

While the invention has been described in detail and with reference to specific embodiments thereof, it will be apparent to one skilled in the art that various changes and modifications can be made therein without departing from the spirit and scope of the invention.

This application is based on Japanese Patent Application No. 2002-025096 filed on Feb. 1, 2002, and the contents thereof are incorporated herein by reference.

INDUSTRIAL APPLICABILITY

The method of the invention for precipitating polyphenylene ether by mixing a polyphenylene ether solution with a poor solvent for polyphenylene ether to precipitate polyphenylene ether particles is a method which can stably produce homogeneous polyphenylene ether particles with less number of fine particles thereof and reduced periodic fluctuations in particle size, and which solves the problems in drying the polyphenylene ether particles and in producing a polyphenylene ether resin composition, thus sufficiently complying with the industrial demands in this field.

The invention claimed is:

1. A method for precipitating polyphenylene ether by mixing a polyphenylene ether solution comprising polyphenylene ether and a good solvent therefor with a poor solvent for polyphenylene ether to precipitate polyphenylene ether particles, the method comprising:

using a precipitation tank equipped with (a) a draft tube, (b) an at least one-stage stirring blade disposed in the draft tube and selected from an inclined paddle blade, a screw blade and a ribbon blade, (c) one or more baffles disposed on the outside of the draft tube, (d) a solution supply port, (e) a poor solvent supply port and (f) an exhaust port;

adding, to a mixed solution comprising the good solvent, the poor solvent and polyphenylene ether particles and circularly flowing by rotation of the stirring blade (b), the polyphenylene ether solution from the solution supply port (d) and concurrently a poor solvent from the poor solvent supply port (e), thereby precipitating polyphenylene ether particles; and discharging and recovering the precipitated polyphenylene ether particles together with the mixed solution from the exhaust port (f).

2. The method for precipitating polyphenylene ether according to claim 1, wherein the mixed solution is overflowed from the exhaust port (f) to discharge the polyphenylene ether particles from the precipitation tank.

3. The method for precipitating polyphenylene ether according to claim 1, wherein the ratio of the precipitation tank diameter/liquid height of the mixed solution in the precipitation tank is from 0.1 to 2, the ratio of the height of the draft tube/said liquid height is from 0.05 to 0.6, and the ratio of a vertical interval between a liquid level and the most upper portion of the draft tube/said liquid height is from 0.01 to 0.3.

4. The method for precipitating polyphenylene ether according to claim 1, wherein the good solvent for polyphenylene ether comprises at least one solvent selected from benzene, toluene and xylene, and the poor solvent for polyphenylene ether comprises at least one solvent selected from methanol, ethanol, isopropanol, n-butanol, acetone, methyl ethyl ketone and water.

5. The method for precipitating polyphenylene ether according to claim 1, wherein the weight ratio of the poor solvent/the good solvent in the mixed solution is from 0.3 to 2.0.

6. The method for precipitating polyphenylene ether according to claim 1, wherein the poor solvent contains water in an amount of 0.3 to 50 parts by weight.

7. The method for precipitating polyphenylene ether according to claim 1, wherein the mixed solution has a temperature of from 30 to 60° C.

8. The method for precipitating polyphenylene ether according to claim 1, giving an average residence time during which the polyphenylene ether particles stay in the precipitation tank of from 2.0 to 30 minutes.

* * * * *